Patented Apr. 22, 1952

2,593,926

UNITED STATES PATENT OFFICE 2,593,926

PHENOL-FORMALDEHYDE CONDENSATION PRODUCTS AND PROCESSES OF PRODUCING SAME

William G. Simons, Rockridge, Greenwich, Conn., assignor to American Cyanamid Company, New York, N. Y., a corporation of Maine No Drawing. Application July 13, 1948, Serial No. 38,558

14 Claims. (Cl. 260—57)

This invention relates to the preparation of dry, stable, water-soluble phenolic-formaldehyde condensation products. More particularly the invention relates to improved phenolic-formaldehyde adhesives and resins.

This application is a continuation-in-part of application Serial No. 609,030, filed August 4, 1945, now abandoned.

Phenolic-formaldehyde condensation products exhibit properties which make them highly desirable in the preparation of adhesive compositions. Both liquid and solid phenolic-formaldehyde products have heretofore been used in such compositions. Liquid adhesives generally are obtained by carrying out a phenolic-formaldehyde condensation where the product remains in a liquid state throughout the reaction. Solid products are usually obtained by the dehydration of the liquid compositions, or by carrying out the condensations to an insoluble state.

Phenolic-formaldehyde condensation products which remain in the liquid state from the time of preparation to the time of use are not always very desirable. Such liquids often prove to be very unstable when subjected to varying temperatures with a result of changes in viscosity. The viscosity changes bring on undue difficulties in cases where the ultilization of the adhesive solution for specific applications requires a limited range of viscosity. Aqueous caustic solutions are the most common solvents for phenolic-formaldehyde condensation products and the transportation of such readily available solvents from place to place involves difficulties and expenditures which could be overcome by supplying the market with a stable, solid, water-soluble, phenolic formaldehyde condensation products.

Solid, water-soluble phenol-formaldehyde products are available, but these products also have undesirable properties. Supplying the market with solid, water-soluble condensation products is achieved by the dehydration of products where the condensation is not allowed to go beyond the liquid state. The solid products prepared by this method have a softening point which is not high enough to insure safe storage and, to prevent caking when stored for even short periods, it is necessary to coat the solid particles with an inert powdered material. This does not wholly preclude caking, for excessive handling of the product tends to dislodge the powdered material from the surfaces of the adhesive particles and the particles are then liable to cake. Another method for obtaining solid, water-soluble products is by carrying out the phenol-formaldehyde condensation to an insoluble state and dehydrating, followed by an admixture with a sufficient quantity of a basic compound to effect solubility when mixed with water. The most easily available basic compounds are not suitable for use in such a method, as for example, the alkali hydroxides, because such mixtures would be subject to caking upon storage due to the hygroscopic properties of these bases.

An object of this invention is to produce solid, water-soluble, phenolic-formaldehyde condensation products.

Another object of this invention is to produce products which have excellent adhesive properties.

A further object is to prepare resinous compositions containing improved phenolic resins.

A still further object is to prepare phenolic-formaldehyde condensation products which have good stability and good anti-caking properties after spray-drying.

These and other objects are attained as herein disclosed.

An important feature in the present invention is the selective control of the course of the phenolic-formaldehyde condensation. As previously mentioned, prior to the present invention, solid soluble condensation products were chiefly obtained by the reaction of a phenolic compound and formaldehyde under conditions so that solid products did not form, with subsequent dehydration by suitable means. These products failed to give good stability after drying and required precautionary measures, such as coating the particles, to prevent the caking thereof. The low softening point of such products is often a cause of this difficulty. According to the prior art, it appeared that to have a high softening point, the property of solubility of the resin was inevitably sacrificed, and conversely, to have a solid water-soluble product, the high softening point was inevitably lost. The present invention makes it possible to obtain water-soluble, dry products with high softening points by effecting a formation of a linear molecular structure of the condensation product during the first stage of reaction followed by a second stage reaction under conditions herein disclosed.

During the first stage, molecules of the desired structure are obtained by condensing 1 mol of a phenolic compound with less than 1 mol of formaldehyde. By keeping the reactants within the stated limits, the molar ratio of formaldehyde to phenol is kept at a value of less than 1:1 so as to effect a linear condensation. This condensation is preferably carried out in the presence of an acidic catalyst, in that the desired methylene linkages are more readily formed than in the case where a basic catalyst might be utilized. The condensation may be effected at room or elevated temperatures, but it is preferable to carry out the reaction at 80° C. to reflux temperature to obtain a complete condensation with the desired structure within a minimum amount of time, one-half to one hour being satisfactory. The completion of the condensation is evidenced by the formation of products which hydrophobe or become insoluble in water.

After completion of the first stage reaction, a second stage is initiated by increasing the formaldehyde content so that for each mol of the phenolic compound there is more than 1 mol and substantially not more than 3 mols of formaldehyde. Thus, the molar ratio of total formaldehyde to total phenol becomes greater than 1:1 and substantially not more than about 3:1. This condensation is preferably carried out in the presence of a basic catalyst. The use of a basic catalyst obviates the necessity for neutralization as would be the case where an acid might be employed as a catalyst and, furthermore, the formation of methylol groups during this stage is aided by the use of a base. Since the addition of this basic catalyst and second quantity of formaldehyde effects an exothermic reaction, certain precautions must be taken, since the primary object of the invention is to provide dry, water-soluble phenol-formaldehyde resins. It is necessary to maintain the temperature of this second stage reaction at about 80° C., though it may fluctuate on either side thereof, from about 77° C. to about 85° C. In order to prevent the exothermic reaction from causing excessive heating, and resulting in the formation of a high percent of insoluble material, the temperature of the mass during the addition of the basic catalyst and second quantity of formaldehyde, should be maintained at or below the temperature of the second stage reaction. This may be accomplished in several ways, such as for example, slowly adding the basic catalyst and formaldehyde while continuously cooling the reaction mass. This however, is a slow, tedious process which is commercially unfeasible. It has been found that by cooling the first stage reaction product to between 40° C.–50° C., the basic catalyst and second quantity of formaldehyde may be charged to the reaction mass, and the resultant exothermic reaction raises the mass to about 80° C., at which temperature it is held for the completion of the second stage reaction. The reaction may be terminated at any desirable point depending upon the viscosity desired. For example, a good product results when the reaction is allowed to proceed to a point where the viscosity attains a value of about 500 centipoises, but a viscosity which is much higher or lower may be obtained by carrying out the second-stage condensation for a longer or shorter period, respectively, such viscosity being determined primarily on the basis of the use to which the product is to be directed. Aqueous compositions comprising the condensation products, wherein the viscosity ranges from about 400 to about 1100 centipoises, may be satisfactorily spray dried to give water-soluble resins. The amount of base used during this stage may vary widely, for example, from about 2% to 20% based on the weight of the phenolic compound. When the amount of base used to catalyze the condensation is less than about 10%, a final addition of from 1 to 10% may be added before spray-drying to insure good solubility properties of the dried product.

Usually adhesive solutions which are used in non-analogous arts require different viscosities. The procedure outlined herein offers a plurality of means for the control of viscosities. Variation of the phenol-formaldehyde ratio in the first and/or second stage results in a variation of viscosity. The speed of reaction and the length of time of reaction of the first and/or second stage likewise influence the viscosity. During spray-drying the temperature of the chamber into which the solution is introduced is another factor in the viscosity of a solution obtained by subsequently dissolving the spray-dried product. The multiple means for the control of the viscosity is a highly desirable and useful feature of the invention.

Acids and bases in general are found to be good catalysts such as, for example, sodium hydroxide, potassium hydroxide, barium hydroxide, sodium carbonate, ammonium hydroxide, sulfuric acid, hydrochloric acid, acetic acid and phosphoric acid. Phosphoric acid is an exceptionally efficient catalyst for a first-stage condensation. About 1% of the acid based on the weight of the phenolic compound gives excellent results. When hydrochloric acid is used about 0.05% based on the weight of the phenolic compound gives a good reaction rate. The acid catalysts may be used in proportions of 0.01% to 2.0%. Among the bases, sodium hydroxide is a very efficient catalyst and may be used in varying amounts, for example, from 2% to 20% based on the weight of the phenolic compound.

The reaction may be carried out in the presence of other aldehyde reactive compounds such as melamine, urea, and the like. In place of formaldehyde, other aldehydes, for example, acetaldehyde, or compounds yielding aldehydes such as paraformaldehyde and trioxane may be used along or in admixture with formaldehyde. Modifiers such as melamine, aniline, urea, or their aldehyde condensation products or other resin forming bodies may be added to the products obtained in accordance with the present invention to give desired properties. Among the phenolic compounds which fall within the scope of the invention are: phenol, cresol, xylenol, alkyl phenols, such as tertiary butyl phenols, amyl phenols and the like.

The condensation products may be used in the liquid as well as in the solid state. They are suitable for use in laminating, binding, impregnating, coating compositions and in various other arts requiring adhesives or resins. The products may be put to further use, such as for molding or casting, and may satisfactorily be used with fillers or extenders.

The products of the invention can also be advantageously adapted for use in the manufacture of paints and other coating compositions, since they are soluble in organic solvents, such as the lower aliphatic alcohols and ketones as well as in aqueous solvents and are capable of being cured to give infusible and insoluble products. Due to the broad viscosity ranges obtainable by the present invention, the products can be advantageously incorporated into coating compositions for the purpose of controlling film thicknesses. A small amount of a highly viscous resin in a paint composition greatly aids in effecting a thicker film. To this purpose the phenolic products of this invention can be directed with resulting efficiency and economy. When the product of this invention is to be used in a coating composition, it may be desirable to use an organic amine as the basic catalyst during the second stage where an inorganic base might give rise to unfavorable results. Phenolic compounds which have long chain alkyl substituents are desirable reactants when the products are to be used in coating compositions since the solubility in the conventional organic solvents is thereby enhanced. Highly useful resins may be obtained by reacting the products obtained by the process of the present invention with polycarboxylic acids or by incorporation of the products into alkyd resin compositions.

The condensation products of the present invention show an excellent retention of the properties of water solubility and anti-caking upon storage. A good solid, water-soluble phenolic adhesive should be able to withstand a minimum of storage of six weeks at about 80° F. without caking or losing its bonding strength. A product prepared according to the procedure disclosed herein was found to give good results after storage for a period of about six months.

The exceptional water solubility characteristic of the products of the present invention creates a wider utility for phenol-formaldehyde resins. The products are infinitely dilutable with water thus enabling the use of various concentrations of the condensation products. Impregnation of paper, fabrics and the like, can be performed economically and efficiently by use of the new products. The property of infinite dilutability also is very desirable from the standpoint of cleansing the equipment used for various applications of the condensation products.

The following examples are given by way of illustration and not in limitation. Modifications and variations of the processes disclosed may be made without departing from the spirit and scope of the invention. Unless otherwise indicated, quantities are given in parts by weight.

Example 1

The following materials are charged into a kettle:

334 parts of phenol
144 parts of formalin (37% aqueous formaldehyde)
3.3 parts of phosphoric acid (85%)

The materials are refluxed for about 1 hour followed by cooling of the contents to about 50° C. The additional materials are added:

317 parts of formalin (37% aqueous formaldehyde)
133 parts of sodium hydroxide (as a 20% aqueous solution)

The contents of the kettle are then heated at about 80° C. until a viscosity of 370 centipoises at 25° C. is reached. Upon cooling to about room temperature, the viscosity becomes about 550 centipoises at 25° C. Forty-four parts of a 20% aqueous sodium hydroxide solution are added causing the viscosity to decrease to 430 centipoises at 25° C. Spray-drying yields a dry, water-soluble powdery material.

Example 2

The following materials are charged into a kettle:

564 parts of phenol
243 parts of formalin (37% aqueous formaldehyde)
6.6 parts of phosphoric acid (85%)

The mixture is refluxed for about 1 hour and after cooling to about 45° C., the following materials are added:

535 parts of formalin (37% aqueous formaldehyde)
220 parts sodium hydroxide (as a 20% aqueous solution)

After heating for about 2½ hours at about 80° C. the viscosity is 427 centipoises at 25° C. The solution is spray-dried and yields a dry, water-soluble, powdery material.

Example 3

The procedure in Example 2 is simulated with the exception that the second stage reaction is continued for 3 hours. The final viscosity is about 700 centipoises at 25° C.

Example 4

The following materials are charged into a kettle:

564 parts of phenol
292 parts of formalin (37% aqueous formaldehyde)
1.3 parts of hydrochloric acid (as a 20% aqueous solution)

The mixture is heated for about one-half hour at about 80° C., cooled to about 40° C. and the following materials added:

437 parts of formalin (37% aqueous formaldehyde)
172 parts of sodium hydroxide (as a 20% aqueous solution)

Heating at about 80° C. for 2 hours gives a viscosity of about 700 centipoises. The solution is spray-dried to give a dry, water-soluble powdery material.

Example 5

A procedure similar to that in Example 4 is carried out with the exception that 243 and 535 parts formalin are used for the first and second stages respectively. The second stage reaction is carried out for about 165 minutes yielding a viscosity of about 1070 centipoises at 25° C.

Example 6

In place of phenol a commercial grade of cresol marketed as "Cresol #8" is used. This product consists of about 45% meta-cresol, about 3–4% phenol and the remainder contains the ortho and para forms of cresol.

The following materials are charged into a kettle:

1654 parts of "Cresol #8"
614 parts of formalin (37% aqueous formaldehyde)
19 parts of phosphoric acid (85%)

The mixture is heated for about one hour at about 80° C. and then cooled to about 40° C. and the following materials added:

1352 parts of formalin (37% aqueous formaldehyde)
646 parts of sodium hydroxide (as a 20% aqueous solution)

The composite mixture is heated at about 80° C. until a desired viscosity is reached. Four hundred and thirty parts of sodium hydroxide, in the form of a 20% aqueous solution, are added and the solution is spray-dried yielding a dry water-soluble product.

Shear strength determinations were made using the phenolic-formaldehyde condensation products made according to the invention described herein, and the results are shown in Tables I and II. The determinations were made according to the Army-Navy Aeronautical Specification AN-NN-P-511-b, dated April 25, 1942, and as amended March 19, 1943.

TABLE I

*Phenol-formaldehyde condensation product*

| Test Number | Dry | | Wet | |
|---|---|---|---|---|
| | Shear Strength lbs./sq. in. | Estimated per cent of failure caused by wood failure | Shear Strength lbs./sq. in. | Estimated per cent of failure caused by wood failure |
| 1 | 519 | 62 | 539 | 100 |
| 2 | 555 | 54 | 527 | 84 |
| 3 | 602 | 48 | 625 | 86 |
| 4 | 521 | 24 | 524 | 90 |
| 5 | 527 | 2 | 490 | 66 |
| 6 | 569 | 48 | 504 | 60 |
| 7 | 540 | 56 | 585 | 80 |

TABLE II

*Cresol-formaldehyde condensation product*

| Test Number | Dry | | Wet | |
|---|---|---|---|---|
| | Shear Strength lbs./sq. in. | Estimated per cent of failure caused by wood failure | Shear Strength lbs./sq. in. | Estimated per cent of failure caused by wood failure |
| 1 | 500 | 80 | 430 | 0 |
| 2 | 530 | 60 | 420 | 20 |
| 3 | 580 | 60 | 460 | 80 |
| 4 | 390 | 60 | 260 | 60 |
| 5 | 600 | 80 | 430 | 100 |
| 6 | 450 | 0 | 290 | 100 |
| 7 | 520 | 50 | 400 | 60 |
| 8 | 510 | 10 | 360 | 80 |
| 9 | 670 | 30 | 400 | 20 |
| 10 | 450 | 60 | 390 | 90 |

The results of shear strength tests as enumerated above exceed the Army-Navy requirements by a wide margin. According to the previously mentioned specification, resin-bonded plywood is required to have a minimum shear strength of 380 pounds per square inch for a dry test and a minimum of 290 pounds per square inch for a wet test.

Phenolic compounds used in accordance with the description throughout the specification and claims, are phenols which are monocyclic containing but one nuclear hydroxyl group and having at least three replaceable hydrogens attached to the carbon atoms of the nuclear ring. Furthermore, mixtures of such phenols may be used.

Obviously, many modifications in the processes and compositions described above may be made without departing from the spirit and scope of the invention as defined in the appended claims.

I claim:

1. A process for the preparation of water-soluble condensation products comprising reacting by heating at a temperature of about 80° C. to the reflux temperature for about ½–1 hour, 1 mol of a phenolic compound, selected from the group consisting of phenol and alkyl substituted phenols, said phenolic compound being monocyclic, containing one nuclear hydroxyl group and having at least three replaceable hydrogen atoms joined to three nuclear carbon atoms, with less than 1 mol of formaldehyde but not substantially less than 0.5 mol of formaldehyde in an aqueous medium in the presence of an acidic catalyst, then cooling to about 40–50° C. and then adding formaldehyde so that for each mol of the phenolic compound there is more than 1 mol and substantially not more than 3 mols of formaldehyde and continuing the reaction by heating at about 80° C. in the presence of a basic catalyst until a viscosity of about 400 to 1100 centipoises at 25° C. is reached.

2. A process for the preparation of water-soluble condensation products comprising reacting by heating at a temperature of about 80° C. to the reflux temperature for about ½–1 hour 1 mol of a phenolic compound, selected from the group consisting of phenol and alkyl substituted phenols, said phenolic compound being monocyclic, containing one nuclear hydroxyl group and having at least three replaceable hydrogen atoms joined to three nuclear carbon atoms, with less than 1 mol of formaldehyde but not substantially less than 0.5 mol of formaldehyde in an aqueous medium in the presence of from about 0.01 to 2% of an inorganic acid, based on the weight of the phenolic compound, then cooling to about 40–50° C. and then adding formaldehyde so that for each mol of the phenolic compound there is more than 1 mol and substantially not more than 3 mols of formaldehyde and continuing the reaction by heating at about 80° C. in the presence of from 2 to 20% of an inorganic base until a viscosity of about 400 to 1100 centipoises at 25° C. is reached.

3. A process for the preparation of water-soluble condensation products comprising reacting by heating at a temperature of about 80° C. to the reflux temperature for about ½–1 hour, 1 mol of a phenolic compound, selected from the group consisting of phenol and alkyl substituted phenols said phenolic compound being monocyclic, containing one nuclear hydroxyl group and having at least three replaceable hydrogen atoms joined to three nuclear carbon atoms, with less than 1 mol of formaldehyde but not substantially less than 0.5 mol of formaldehyde in an aqueous medium in the presence of from 0.01 to 2% of phosphoric acid, based on the weight of the phenolic compound, then cooling to about 40–50° C. and then adding formaldehyde so that for each mol of the phenolic compound there is more than 1 mol and substantially not more than 3 mols of formaldehyde and continuing the reaction by heating at about 80° C. in the presence of from 2 to 20% of sodium hydroxide until a viscosity of about 400 to 1100 centipoises at 25° C. is reached.

4. A process for the preparation of water-soluble condensation products comprising reacting by heating at a temperature of about 80° C. to the reflux temperature for about ½–1 hour, 1 mol of a phenolic compound, selected from the group consisting of phenol and alkyl substituted phenols, said phenolic compound being monocyclic, containing one nuclear hydroxyl group and having at least three replaceable hydrogen atoms joined to three nuclear carbon atoms, with less than 1 mol of formaldehyde but not substantially less than 0.5 mol of formaldehyde in an aqueous medium in the presence of from 0.01 to 2% of hydrochloric acid, based on the weight of the phenolic compound, then cooling to about 40–50° C. and then adding formaldehyde so that for each mol of the phenolic compound there is more than 1 mol and substantially not more than 3 mols of formaldehyde, and continuing the reaction by heating at about 80° C. in the presence of from 2 to 20% of sodium hydroxide until a viscosity of about 400 to 1100 centipoises at 25° C. is reached.

5. A process for the preparation of water-soluble condensation products comprising reacting by heating at a temperature of about 80° C. to the reflux temperature for about ½–1 hour, 1 mol of phenol with less than 1 mol of formaldehyde but not substantially less than 0.5 mol of formaldehyde in an acidic aqueous medium, then cooling to about 40–50° C. and then adding formaldehyde so that for each mol of the phenol there is more than 1 mol and substantially not more than 3 mols of formaldehyde and continuing the reaction by heating at about 80° C. in the presence of a basic catalyst until a viscosity of about 400 to 1100 centipoises at 25° C. is reached.

6. A process for the preparation of water-soluble condensation products comprising reacting by heating at a temperature of about 80° C. to the reflux temperature for about ½–1 hour, 1 mol of cresol with less than 1 mol of formaldehyde but not substantially less than 0.5 mol of formaldehyde in an aqueous medium in the presence of an acidic catalyst, then cooling to about 40–50° C., adding formaldehyde so that for each mol of cresol there is more than 1 mol and substantially not more than 3 mols of formaldehyde and continuing the reaction by heating at about 80° C. in the presence of a basic catalyst until a viscosity of about 400 to 1100 centipoises at 25° C. is reached.

7. A process for the preparation of water-soluble condensation products comprising reacting by heating at a temperature of about 80° C. to the reflux temperature for about ½–1 hour, 1 mol of phenol with less than 1 mol of formaldehyde but not substantially less than 0.5 mol of formaldehyde in an aqueous medium in the presence of from 0.01 to 2% of phosphoric acid, based on the weight of the phenol, then cooling to about 40–50° C. and then adding formaldehyde so that for each mol of phenol there is more than 1 mol and substantially not more than 3 mols of formaldehyde and continuing the reaction by heating at about 80° C. in the presence of from 2 to 20% of sodium hydroxide until a viscosity of about 400 to 1100 centipoises at 25° C. is reached.

8. A process for the preparation of water-soluble condensation products comprising reacting by heating at a temperature of about 80° C. to the reflux temperature for about ½–1 hour, 1 mol of phenol with less than 1 mol of formaldehyde but not substantially less than 0.5 mol of formaldehyde in an aqueous medium in the presence of from 0.01 to 2% of hydrochloric acid, based on the weight of the phenol, then cooling to about 40–50° C. and then adding formaldehyde so that for each mol of phenol there is more than 1 mol and substantially not more than 3 mols of formaldehyde, and continuing the reaction by heating at about 80° C. in the presence of from 2 to 20% of sodium hydroxide until a viscosity of about 400 to 1100 centipoises at 25° C. is reached.

9. A process for the preparation of water-soluble condensation products comprising reacting by heating at a temperature of about 80° C. to the reflux temperature for about ½–1 hour, 1 mol of cresol with less than 1 mol of formaldehyde but not substantially less than 0.5 mol of formaldehyde in an aqueous medium in the presence of from 0.01 to 2% of phosphoric acid, based on the weight of the cresol, then cooling to about 40–50° C. and then adding formaldehyde so that for each mol of cresol there is more than 1 mol and substantially not more than 3 mols of formaldehyde and continuing the reaction by heating at about 80° C. in the presence of from 2 to 20% of sodium hydroxide until a viscosity of about 400 to 1100 centipoises at 25° C. is reached.

10. A process for the preparation of water-soluble condensation products comprising reacting by heating at a temperature of about 80° C. to the reflux temperature for about ½–1 hour, 1 mol of cresol with less than 1 mol of formaldehyde but not substantially less than 0.5 mol of formaldehyde in an aqueous medium in the presence of from 0.01 to 2% of hydrochloric acid, based on the weight of the cresol, then cooling to about 40–50° C. and then adding formaldehyde so that for each mol of cresol there is more than 1 mol and substantially not more than 3 mols of formaldehyde, and continuing the reaction by heating at about 80° C. in the presence of from 2 to 20% of sodium hydroxide until a viscosity of about 400 to 1100 centipoises at 25° C. is reached.

11. The water soluble condensation product produced in accordance with the process of claim 1 in which the amount of basic catalyst present varies between about 2% at the lower viscosity value to about 20% at the higher viscosity value.

12. The water soluble condensation product produced in accordance with the process of claim 5 in which the amount of basic catalyst present varies between about 2% at the lower viscosity value to about 20% at the higher viscosity value.

13. A water soluble product obtained by spray drying the product in claim 11.

14. A water soluble product obtained by spray drying the product in claim 12.

WILLIAM G. SIMONS.

REFERENCES CITED

The following references are of record in the file of this patent:

UNITED STATES PATENTS

| Number | Name | Date |
|---|---|---|
| 2,120,549 | Dike | June 14, 1938 |
| 2,400,718 | Siegel | May 21, 1946 |